US010298532B2

(12) United States Patent
Hiir et al.

(10) Patent No.: US 10,298,532 B2
(45) Date of Patent: May 21, 2019

(54) MESSAGE DELIVERY SYSTEM AND METHOD

(71) Applicant: Skype, Dublin (IE)

(72) Inventors: Tanel Hiir, Tallinn (EE); Kaido Karner, Tallinn (EE); Priit Kasesalu, Tallinn (EE); Mati Kosemae, Rae Vald (EE); Aarne Laur, Tallinn (EE); Mihkel Karu, Harku Vald (EE); Sven Suursoho, Tallinn (EE)

(73) Assignee: SKYPE, Dublin (IE)

( * ) Notice: Subject to any disclaimer, the term of this patent is extended or adjusted under 35 U.S.C. 154(b) by 0 days.

(21) Appl. No.: 15/692,896

(22) Filed: Aug. 31, 2017

(65) Prior Publication Data
US 2017/0366494 A1    Dec. 21, 2017

Related U.S. Application Data

(63) Continuation of application No. 11/937,069, filed on Nov. 8, 2007, now Pat. No. 9,756,004.

(51) Int. Cl.
G06F 15/16 (2006.01)
H04L 12/58 (2006.01)
(Continued)

(52) U.S. Cl.
CPC .......... H04L 51/22 (2013.01); G06Q 10/107 (2013.01); H04L 51/04 (2013.01); H04L 51/18 (2013.01);
(Continued)

(58) Field of Classification Search
USPC ....................................................... 709/231
See application file for complete search history.

(56) References Cited

U.S. PATENT DOCUMENTS 5,008,853 A    4/1991  Bly et al.
5,583,993 A   12/1996  Foster et al.
(Continued)

FOREIGN PATENT DOCUMENTS

WO   WO-2005009019    1/2005
WO   WO-2006086353    8/2006

OTHER PUBLICATIONS

"Advisory Action", U.S. Appl. No. 11/937,069, dated May 25, 2010, 3 Pages.
(Continued)

Primary Examiner — Karen C Tang
(74) Attorney, Agent, or Firm — Schwegman Lundberg & Woessner, P.A.

(57) ABSTRACT

In one embodiment, a method of delivering messages to a user of a user terminal executing a communication client and connected to a packet-based communication network, includes receiving a message at the communication client from the communication network, the message comprising a content portion and a control portion, wherein the content portion comprises information intended for display to the user of the user terminal, and storing the message in a data store at the user terminal. The communication client reads the control portion and extracts data defining a trigger event and a condition. The communication client is monitored to determine whether the communication client state corresponds to the trigger event. Responsive to the communication client state corresponding to the trigger event, the communication client determines whether the condition is met. In the case that the condition is met, the content portion of the message is displayed in the communication client.

20 Claims, 12 Drawing Sheets

(51) Int. Cl.
*G06Q 10/10* (2012.01)
*H04L 29/06* (2006.01)
*H04L 29/08* (2006.01)

(52) U.S. Cl.
CPC ........ *H04L 63/0281* (2013.01); *H04L 67/104* (2013.01)

(56) References Cited

U.S. PATENT DOCUMENTS

| | | | |
|---|---|---|---|
| 5,835,384 A | 11/1998 | Lin | |
| 5,935,384 A | 8/1999 | Taniguchi | |
| 5,995,096 A | 11/1999 | Kitahara et al. | |
| 6,226,678 B1 | 5/2001 | Mattaway et al. | |
| 6,237,026 B1 | 5/2001 | Prasad et al. | |
| 6,263,064 B1 | 7/2001 | O'Neal et al. | |
| 6,269,369 B1 | 7/2001 | Robertson | |
| 6,446,113 B1 | 9/2002 | Ozzie et al. | |
| 6,463,145 B1 | 10/2002 | O'Neal et al. | |
| 6,606,305 B1 | 8/2003 | Boyle et al. | |
| 6,631,271 B1* | 10/2003 | Logan | G06F 3/002 340/539.13 |
| 7,020,880 B2 | 3/2006 | Mellen-Garnett et al. | |
| 7,024,429 B2 | 4/2006 | Ngo et al. | |
| 7,602,895 B2 | 10/2009 | Terry et al. | |
| 7,624,172 B1 | 11/2009 | Austin-Lane | |
| 7,668,850 B1* | 2/2010 | Bierner | G06F 17/30011 707/694 |
| 7,701,456 B1* | 4/2010 | Buck | G06F 3/1415 345/440 |
| 7,702,653 B1 | 4/2010 | Tan et al. | |
| 7,778,629 B2 | 8/2010 | Gilzean et al. | |
| 7,809,392 B2 | 10/2010 | Rahkonen | |
| 7,885,187 B2 | 2/2011 | Chun | |
| 7,903,796 B1 | 3/2011 | Kheradpir et al. | |
| 7,908,322 B2 | 3/2011 | Eisenberg | |
| 7,936,863 B2 | 5/2011 | John et al. | |
| 7,969,461 B2 | 6/2011 | Nimri et al. | |
| 8,001,199 B2 | 8/2011 | Applebaum et al. | |
| 8,028,073 B2 | 9/2011 | Maes et al. | |
| 8,200,775 B2 | 6/2012 | Moore | |
| 8,229,083 B2 | 7/2012 | Gilzean et al. | |
| 8,311,513 B1 | 11/2012 | Nasserbakht et al. | |
| 8,321,274 B2 | 11/2012 | Collins et al. | |
| 8,347,088 B2 | 1/2013 | Moore et al. | |
| 8,438,272 B2 | 5/2013 | Kieselbach | |
| 9,756,004 B2 | 9/2017 | Hiir et al. | |
| 2001/0003827 A1 | 6/2001 | Shimamura | |
| 2002/0065748 A1* | 5/2002 | Taniguchi | G06Q 30/02 705/26.81 |
| 2002/0076025 A1 | 6/2002 | Liversidge et al. | |
| 2002/0091769 A1 | 7/2002 | Drozdzewicz et al. | |
| 2002/0149618 A1 | 10/2002 | Estrada et al. | |
| 2002/0169669 A1* | 11/2002 | Stetson | G06Q 30/02 705/14.53 |
| 2003/0004952 A1 | 1/2003 | Nixon et al. | |
| 2003/0013951 A1 | 1/2003 | Stefanescu et al. | |
| 2003/0050802 A1 | 3/2003 | Jay et al. | |
| 2003/0135565 A1 | 7/2003 | Estrada | |
| 2003/0144894 A1 | 7/2003 | Robertson et al. | |
| 2004/0068481 A1 | 4/2004 | Seshadri et al. | |
| 2004/0243772 A1 | 12/2004 | Wissenbach | |
| 2004/0259599 A1 | 12/2004 | Okawa | |
| 2005/0053221 A1 | 3/2005 | Reding et al. | |
| 2005/0071752 A1* | 3/2005 | Marlatt | G06F 17/248 715/222 |
| 2005/0097008 A1* | 5/2005 | Ehring | G06F 17/211 715/205 |
| 2005/0122965 A1 | 6/2005 | Heinla et al. | |
| 2005/0144246 A1* | 6/2005 | Malik | G06Q 10/107 709/206 |
| 2005/0180342 A1 | 8/2005 | Summers et al. | |
| 2005/0223066 A1* | 10/2005 | Buchheit | G06Q 10/107 709/206 |
| 2005/0227679 A1 | 10/2005 | Papulov | |
| 2005/0257254 A1* | 11/2005 | Hamada | G06F 21/10 726/5 |
| 2006/0067252 A1 | 3/2006 | John et al. | |
| 2006/0085417 A1 | 4/2006 | John et al. | |
| 2006/0149571 A1 | 7/2006 | Birch et al. | |
| 2006/0179121 A1 | 8/2006 | Kegoya et al. | |
| 2006/0209794 A1 | 9/2006 | Bae et al. | |
| 2006/0223554 A1* | 10/2006 | Fried | H04L 51/34 455/466 |
| 2007/0005713 A1* | 1/2007 | LeVasseur | G06Q 10/107 709/206 |
| 2007/0074250 A1* | 3/2007 | Furukawa | H04N 5/44513 725/40 |
| 2007/0088852 A1* | 4/2007 | Levkovitz | H04L 12/1859 709/246 |
| 2007/0115919 A1 | 5/2007 | Chahal et al. | |
| 2007/0186157 A1 | 8/2007 | Walker et al. | |
| 2007/0217349 A1 | 9/2007 | Fodor | |
| 2007/0255715 A1 | 11/2007 | Li et al. | |
| 2008/0010148 A1* | 1/2008 | Knibiehly | G06Q 30/00 705/14.23 |
| 2008/0037565 A1 | 2/2008 | Murray et al. | |
| 2008/0040179 A1* | 2/2008 | Masermann | G06Q 10/08 705/330 |
| 2008/0092162 A1* | 4/2008 | Lundy | G06Q 30/00 725/35 |
| 2008/0118051 A1* | 5/2008 | Odinak | H04M 3/42221 379/265.09 |
| 2008/0189388 A1 | 8/2008 | Khare et al. | |
| 2008/0205616 A1 | 8/2008 | Teng et al. | |
| 2008/0209280 A1 | 8/2008 | Dilillo et al. | |
| 2008/0246605 A1 | 10/2008 | Pfeffer et al. | |
| 2008/0261564 A1* | 10/2008 | Logan | G08B 13/1427 455/413 |
| 2008/0320082 A1 | 12/2008 | Kuhlke et al. | |
| 2009/0012847 A1* | 1/2009 | Brooks | G06Q 30/02 705/14.41 |
| 2009/0013045 A1 | 1/2009 | Maes et al. | |
| 2009/0040948 A1 | 2/2009 | Wengrovitz et al. | |
| 2009/0048994 A1 | 2/2009 | Applebaum et al. | |
| 2009/0049090 A1* | 2/2009 | Shenfield | G06Q 30/02 |
| 2009/0061833 A1* | 3/2009 | Ho | H04M 1/72552 455/414.2 |
| 2009/0100468 A1* | 4/2009 | Shaffer | H04N 7/163 725/41 |
| 2009/0109961 A1 | 4/2009 | Garrison et al. | |
| 2009/0125593 A1 | 5/2009 | Hiir et al. | |
| 2009/0179983 A1 | 7/2009 | Schindler | |
| 2011/0087738 A1 | 4/2011 | Bartram et al. | |
| 2011/0145908 A1* | 6/2011 | Ting | G06F 21/32 726/7 |
| 2013/0013988 A1* | 1/2013 | Yamamoto | G06F 17/30244 715/201 |
| 2013/0238572 A1 | 9/2013 | Prahlad et al. | |

OTHER PUBLICATIONS

"Examiner's Answer to Appeal Brief", U.S. Appl. No. 11/937,069, filed Mar. 18, 2015, 12 pages.

"Final Office Action", U.S. Appl. No. 11/937,069, dated Mar. 18, 2010, 13 Pages.

"Final Office Action", U.S. Appl. No. 11/937,069, dated Jun. 27, 2014, 12 pages.

"Final Office Action", U.S. Appl. No. 11/937,069, dated Aug. 21, 2013, 12 pages.

"Non Final Office Action", U.S. Appl. No. 11/937,069, dated Sep. 1, 2009, 11 pages.

"Non-Final Office Action", U.S. Appl. No. 11/937,069, dated Feb. 28, 2014, 12 pages.

"Non-Final Office Action", U.S. Appl. No. 11/937,069, dated Jan. 4, 2013, 14 pages.

"Notice of Allowance", U.S. Appl. No. 11/937,069, dated May 3, 2017, 7 pages.

(56) References Cited

OTHER PUBLICATIONS

"PTAB Decision", U.S. Appl. No. 11/937,069, filed Mar. 1, 2017, 6 pages.

* cited by examiner

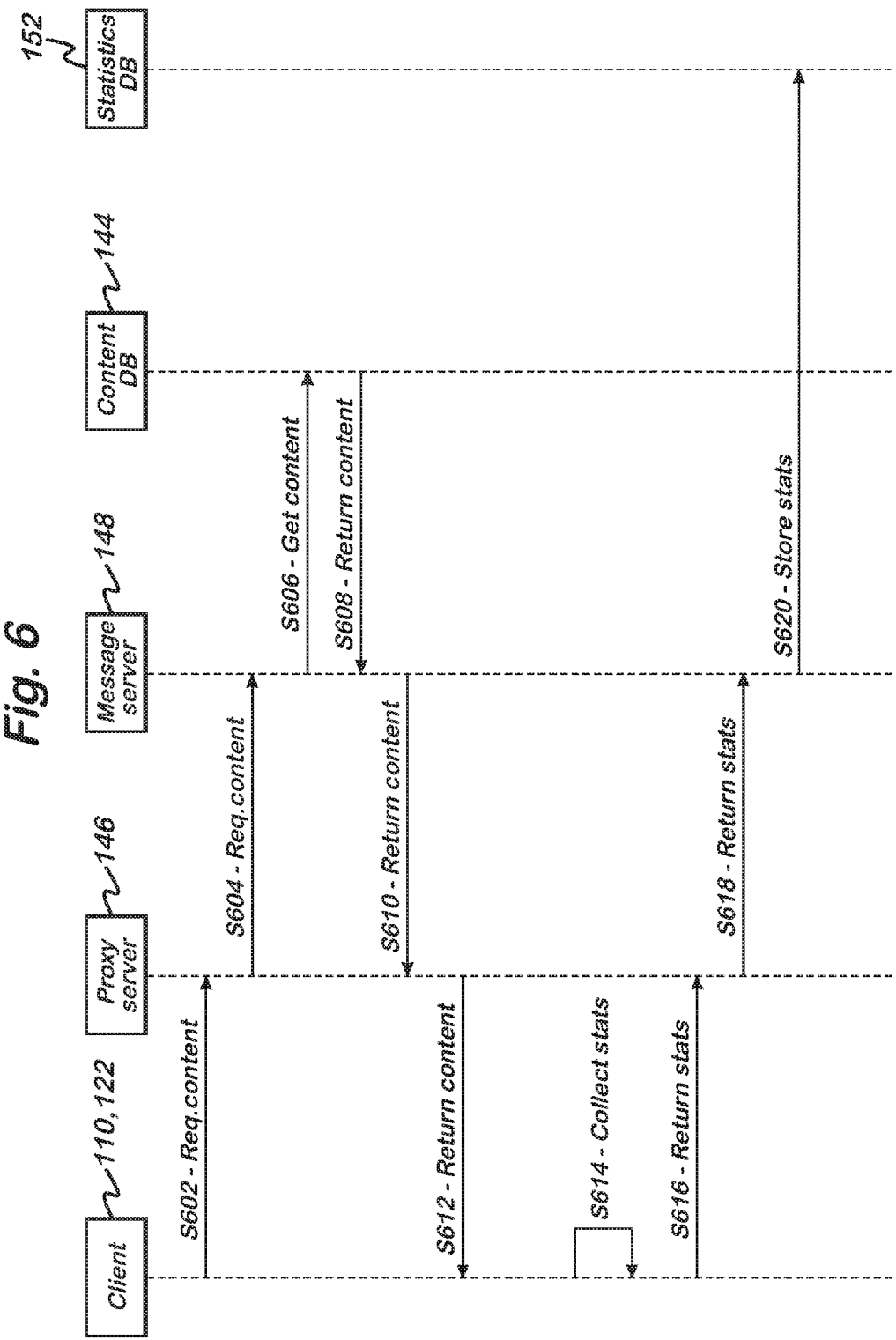

Fig. 13

Skype cannot hear you talking. Click here to select correct Microphone and speaker ⊗ —1302

Don't want to miss a call? Subscribe to Skype Voicemail now ⊗ —1304

You need Skype Credit to call ordinary phones, Buy Skype Credit. ⊗ —1306

Subscribe to SkypeIn and get a local phone number so people you know can tell you on Skype from their landline or mobile. ⊗ —1308

Never run out of Skype Credit again! Buy a little and set up Auto-Recharge! ⊗ —1310

Upgrade to SkypePro and receive exclusive discounts. —1312

If your friend were on Skype, this call would be free, Why don't you invite your friend to get Skype? ⊗ —1314

You should NEVER reveal your password to anyone, no matter who asks and regardless of whether the request is made by phone, email, or in person ⊗ —1316

MESSAGE DELIVERY SYSTEM AND METHOD

RELATED APPLICATIONS

This application is a continuation of and claims priority to U.S. patent application Ser. No. 11/937,069, filed Nov. 8, 2007 and entitled "Message Delivery System and Method", the disclosure of which is incorporated by reference herein in its entirety.

TECHNICAL FIELD

This invention relates to a message delivery system and method, particularly but not exclusively for use in a packet-based communication system.

BACKGROUND

Packet-based communication systems allow the user of a device, such as a personal computer, to communicate across a computer network such as the Internet. Packet-based communications systems include voice over internet protocol ("VoIP") communication systems and instant messaging ("IM") systems. These systems are beneficial to the user as they are often of significantly lower cost than fixed line or mobile networks. This may particularly be the case for long-distance communication. To use a VoIP or IM system, the user must install and execute client software on their device. The client software provides the VoIP or IM connections as well as other functions such as registration and authentication. In addition to voice communication, the client may also provide further features such as video calling.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

In contrast to traditional communication systems such as fixed-line or mobile networks, the communication client for a packet-based communication client has a flexible, rich graphical user interface. The graphical user interface is displayed to the user on a display of the personal computer, and permits the communication client to present a large number of features and options to the user. However, it is difficult for the provider of the client software to inform the user of these features in a timely and non-intrusive manner.

SUMMARY

According to one aspect of the present invention there is provided a method of delivering messages to a user of a user terminal executing a communication client and connected to a packet-based communication network, comprising: receiving a message at the communication client from the communication network, the message comprising a content portion and a control portion, wherein the content portion comprises information intended for display to the user of the user terminal; storing the message in a data store at the user terminal; the communication client reading the control portion of the message and extracting data defining a trigger event and a condition; monitoring the communication client to determine whether the communication client state corresponds to the trigger event; responsive to the communication client state corresponding to the trigger event, the communication client determining whether the condition is met; and in the case that the condition is met, displaying the content portion of the message in the communication client.

Preferably, the condition comprises at least one parameter and at least one respective required value, and the step of determining whether the condition is met comprises reading, for each of the at least one parameters, a current value of the parameter in the communication client and comparing the current value to the respective required value.

Preferably, one of the at least one parameters is a display count for the message and the respective required value defines a maximum number of times the message should be displayed. Preferably, one of the at least one parameters is a time interval parameter and the respective required value defines a start and end time for displaying the message.

In one embodiment, the method further comprises the step of the communication client transmitting a request for messages over the communication network. Preferably, the request for messages comprises an identifier of messages stored at the user terminal. Preferably, the request for messages comprises at least one of a version number for the communication client and an identifier of an operating system executed on the user terminal.

Preferably, the message is received at the communication client in a bundle comprising a plurality of messages.

In another embodiment, the displayed message comprises a selectable control arranged to cause the communication client to display further information to the user. Preferably, the further information is obtained from the communication network. Preferably, the selectable control is a hyperlink comprising a network address of the further information.

Preferably, the communication client is a voice over internet protocol communication client. Preferably, the voice over internet protocol communication client is a peer-to-peer communication client.

According to another aspect of the present invention there is provided a computer program product comprising program code which when executed by a computer implement the steps according to the above-described method.

According to another aspect of the present invention there is provided a user terminal connected to a packet-based communication network, comprising: a data store; a display; and a processor arranged to execute a communication client, wherein the client is configured to: receive a message from the communication network, the message comprising a content portion and a control portion, wherein the content portion comprises information intended for display to the user of the user terminal; store the message in the data store; read the control portion of the message and extract data defining a trigger event and a condition; monitor the communication client to determine whether the communication client state corresponds to the trigger event; determine whether the condition is met responsive to the communication client state corresponding to the trigger event; and display the content portion of the message on the display in the case that the condition is met.

Preferably, the client is further configured to transmit a request for messages over the communication network. In one embodiment, the request for messages comprises an identifier of messages stored at the user terminal. In another embodiment, the request for messages comprises at least one of a version number for the communication client and an identifier of an operating system executed on the user terminal.

Preferably, the message is received at the communication client in a bundle comprising a plurality of messages.

Preferably, the displayed message comprises a selectable control arranged to cause the communication client to display further information to the user. In one embodiment, the further information is obtained from the communication network. In another embodiment, the selectable control is a hyperlink comprising a network address of the further information.

Preferably, the data store is a message database. Preferably, the communication client is a voice over internet protocol communication client. Preferably, the voice over internet protocol communication client is a peer-to-peer communication client.

BRIEF DESCRIPTION OF THE DRAWINGS

For a better understanding of the present invention and to show how the same may be put into effect, reference will now be made, by way of example, to the following drawings in which:

FIG. 6 shows the process for a client to fetch a message.

FIG. 13 shows example messages displayed in the client.

DETAILED DESCRIPTION

Figure 1:
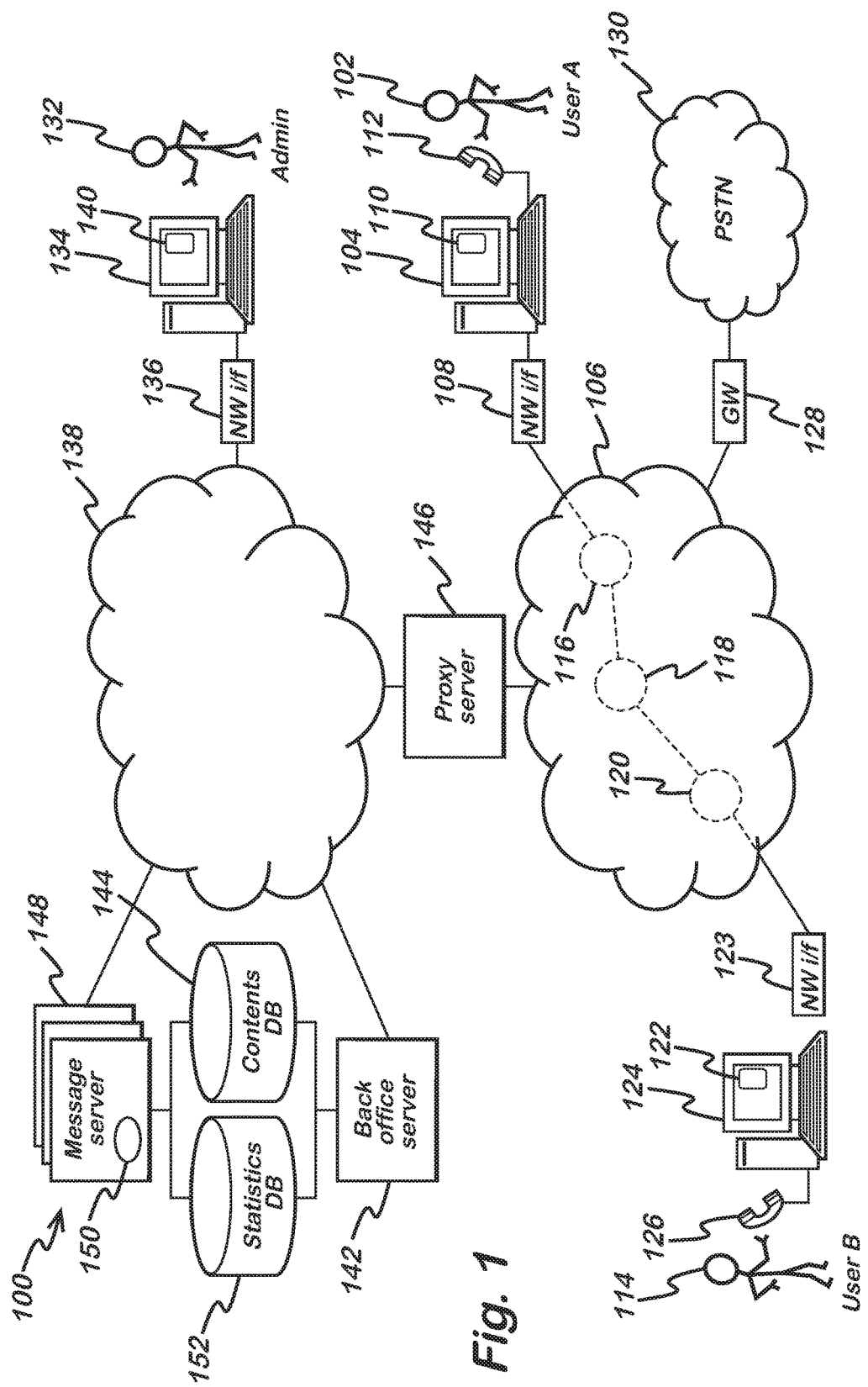
FIG. 1 shows a P2P communication system.

Reference is first made to FIG. 1, which illustrates a P2P communication system 100. Note that whilst this illustrative embodiment is described with reference to a P2P communication system, other types of communication system could also be used, such as instant messaging systems and other, non-P2P, VoIP systems. A first user of the P2P communication system (denoted "User A" 102) operates a user terminal 104, which is shown connected to a P2P network 106. Note that the P2P network 106 utilises a communication system such as the Internet, but is illustrated as a separate network in FIG. 1 for clarity. The user terminal 104 may be, for example, a personal computer ("PC"), personal digital assistant ("PDA"), a mobile phone, a gaming device or other embedded device able to connect to the P2P network 106. The user device is arranged to receive information from and output information to a user of the device. In a preferred embodiment of the invention the user device comprises a display such as a screen and a keyboard and mouse. The user device 104 is connected to the P2P network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104.

Figure 2:
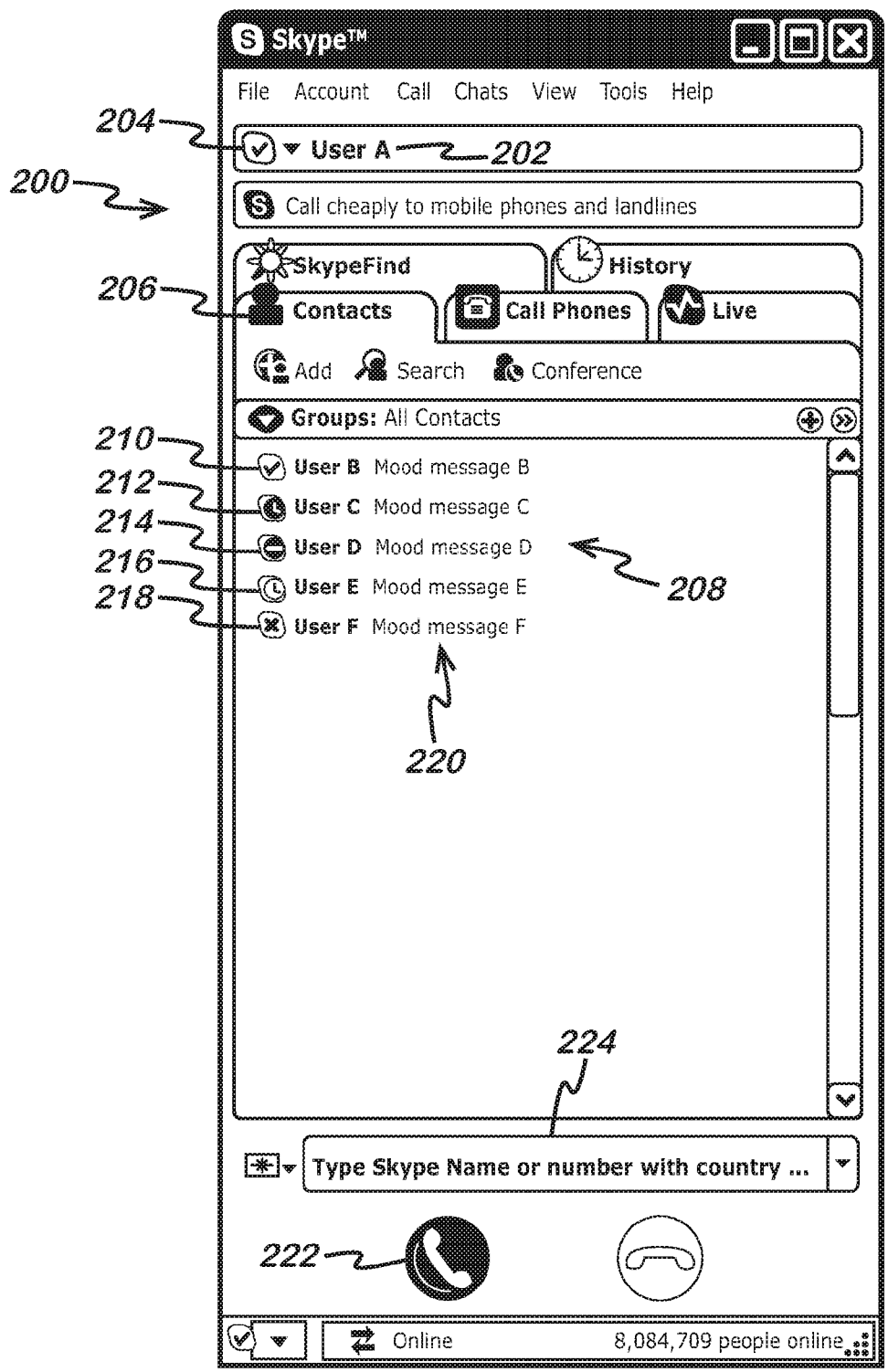
FIG. 2 shows an example user interface of a client.

An example of a user interface 200 of the client 110 executed on the user terminal 104 of User A 102 is shown illustrated in FIG. 2. The client user interface 200 displays the username 202 of User A 102 in the P2P system, and User A can set his own presence state (that will be seen by other users) using a drop down list by selecting icon 204.

The client user interface 200 comprises a tab 206 labelled "contacts", and when this tab is selected the contacts stored by the user in a contact list are displayed. In the example user interface in FIG. 2, five contacts of other users of the P2P system (User B to F) are shown listed in contact list 208. Each of these contacts have authorised the user of the client 110 to view their contact details and online presence and mood message information. Each contact in the contact list has a presence status icon associated with it. For example, the presence status icon for User B 210 indicates that User B is "online", the presence icon for User C 212 indicates that User C is "not available", the presence icon for User D 214 indicates that User D's state is "do not disturb", the presence icon for User E 216 indicates User E is "away", and the presence icon for User F 218 indicates that User F is "offline". Further presence indications can also be included. Next to the names of the contacts in pane 208 are the mood messages 220 of the contacts.

The contact list for the users (e.g. the contact list 208 for User A) is stored in a contact server (not shown in FIG. 1). When the client 110 first logs into the P2P system the contact server is contacted, and the contact list is downloaded to the user terminal 104. This allows the user to log into the P2P system from any terminal and still access the same contact list. The contact server is also used to store the user's own mood message (e.g. the mood message of User A 102) and a picture selected to represent the user (known as an avatar). This information can be downloaded to the client 110, and allows this information to consistent for the user when logging on from different terminals. The client 110 also periodically communicates with the contact server in order to obtain any changes to the information on the contacts in the contact list, or to update the stored contact list with any new contacts that have been added. Presence information is not stored centrally in the contact server. Rather, the client 110 periodically requests the presence information for each of the contacts in the contact list 208 directly over the P2P system. Similarly, the current mood message for each of the contacts, as well as a picture (avatar) that has been chosen to represent the contact, are also retrieved by the client 110 directly from the respective clients of each of the contacts over the P2P system.

Calls to the P2P users in the contact list may be initiated over the P2P system by selecting the contact and clicking on a "call" button 222 using a pointing device such as a mouse. Alternatively, the call may be initiated by typing in the P2P identity of a contact in the field 224. Referring again to FIG. 1, the call set-up is performed using proprietary protocols, and the route over the network 106 between the calling user and called user is determined by the peer-to-peer system without the use of servers. In FIG. 1, an illustrative route is shown between the caller User A (102) and the called party, User B (114), via other peers (116, 118, 120) of the P2P system. It will be understood that this route is merely an example, and that the call may be routed via fewer or more peers.

Following authentication through the presentation of digital certificates (to prove that the users are genuine subscribers of the P2P system—described in more detail in WO 2005/009019), the call can be made using VoIP. The client 110 performs the encoding and decoding of VoIP packets. VoIP packets from the user terminal 104 are transmitted into the network 106 via the network interface 108, and routed to the computer terminal 122 of User B 114, via a network interface 123. A client 124 (similar to the client 110) running on the user terminal 122 of User B 114 decodes the VoIP packets to produce an audio signal that can be heard by User B using the handset 126. Conversely, when User B 114 talks into handset 126, the client 124 executed on user terminal 122 encodes the audio signals into VoIP packets and transmits them across the network 106 to the user terminal 104. The client 110 executed on user terminal 104 decodes the VoIP packets from User B 114, and produces an audio signal that can be heard by the user of the handset 112.

The VoIP packets for calls between P2P users (such as 102 and 114) as described above are passed across the network 106 only, and the PSTN network is not involved. Furthermore, due to the P2P nature of the system, the actual voice calls between users of the P2P system can be made with no central servers being used. This has the advantages that the network scales easily and maintains a high voice quality, and the call can be made free to the users. Additionally, calls can also be made from the client (110, 122) using the P2P system to fixed-line or mobile telephones, by routing the call via a gateway 128 to the PSTN network 130. Similarly, calls from fixed-line or mobile telephones can be made to the P2P system via the PSTN 130 and gateway 128.

Figure 3:
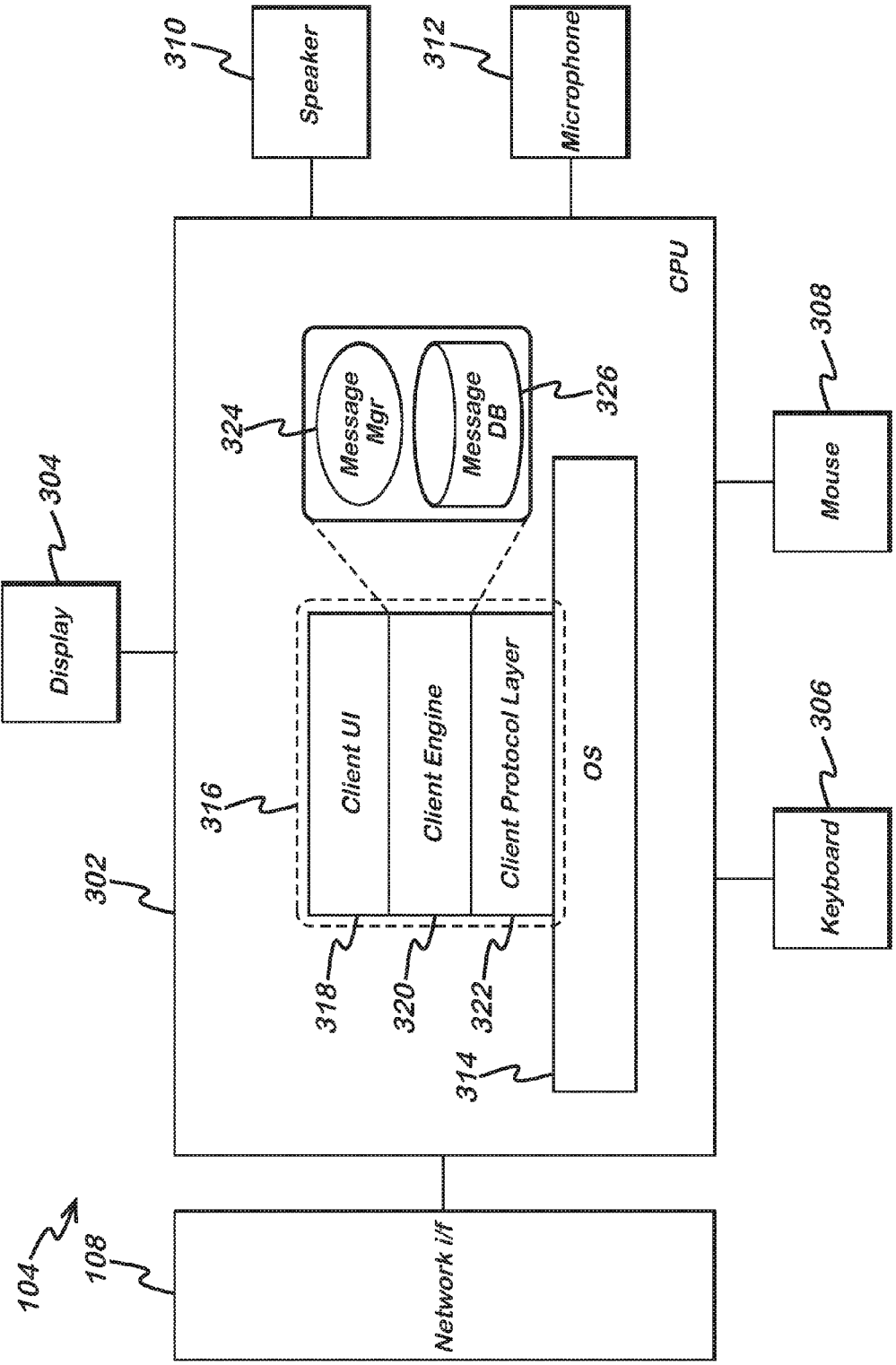
FIG. 3 shows a detailed view of a user terminal.

FIG. 3 illustrates a detailed view of the user terminal (104) on which is executed client 110. The user terminal 104 comprises a central processing unit ("CPU") 302, to which is connected a display 304 such as a screen, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 322, a client engine layer 320 and a client user interface layer ("UI") 318. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 322 of the client software communicates with the operating system 314 and manages the connections over the P2P system. Processes requiring higher level processing are passed to the client engine layer 320. In particular, the client engine layer 320 comprises message manager functionality 324 and a message database 326. The functionality of these elements will be described in more detail hereinafter. The client engine 320 also communicates with the client user interface layer 318. The client engine 320 may be arranged to control the client user interface layer 318 to present information to the user via the user interface of the client (as shown in FIG. 2) and to receive information from the user via the user interface. The control of the client user interface 318 will be explained in more detail hereinafter.

As mentioned, the use of P2P client software permits the inclusion of a large number of features that can be used by the users. However, there is a difficulty in keeping the users informed of these features. Furthermore, it is useful for the P2P software provider to be able to inform the users of promotions that are available, and to give the users feedback in the case of detected problems or errors.

Error messages and information/help messages can be built into the client (i.e. hard-coded) such that they can be shown to the users as soon as the client is installed and executed on the user's terminal. However, this has the significant disadvantage that the messages cannot be adapted or changed without the user installing a new version of the client. For example, the P2P software provider may become aware that a particular feature is not being used frequently by the users, because the users are either unaware of its existence or do not understand how to use it. In such cases, hard-coded messages cannot change in order to inform the user of this feature. Similarly, the P2P software provider may begin offering a new promotion or pricing plan, which cannot be communicated through the client until a new version is released with the hard-coded messages.

There is therefore a need for a dynamic message delivery system that permits the delivery of messages from the P2P software provider to the clients, such that these messages can be displayed by the clients to inform the users of pertinent information.

A dynamic message delivery system is shown illustrated in FIG. 1. Before the process by which the messages are delivered to the clients and displayed to the users is described, the process for creating the messages is outlined.

The messages are preferably created by an administrator affiliated with the P2P software provider. However, in some embodiments, this role could be fulfilled by a trusted third party. Referring to FIG. 1, the administrator 132 operates a user terminal 134 that is connected via a network interface 136 to a network 138 such as the Internet. Executed on a processor of the user terminal 134 is a web browser program 140. The web browser program 140 is used to view web pages retrieved over the network 138 using the hypertext transfer protocol ("HTTP"). It will be understood that the network 106 used by the P2P system and the network 138 used by the administrator 132 are both, in practice, the Internet. However, they are shown separately in FIG. 1 in order to distinguish between the information passed over the P2P system (network 106) and the information passed over the World Wide Web (network 138).

Figure 4:
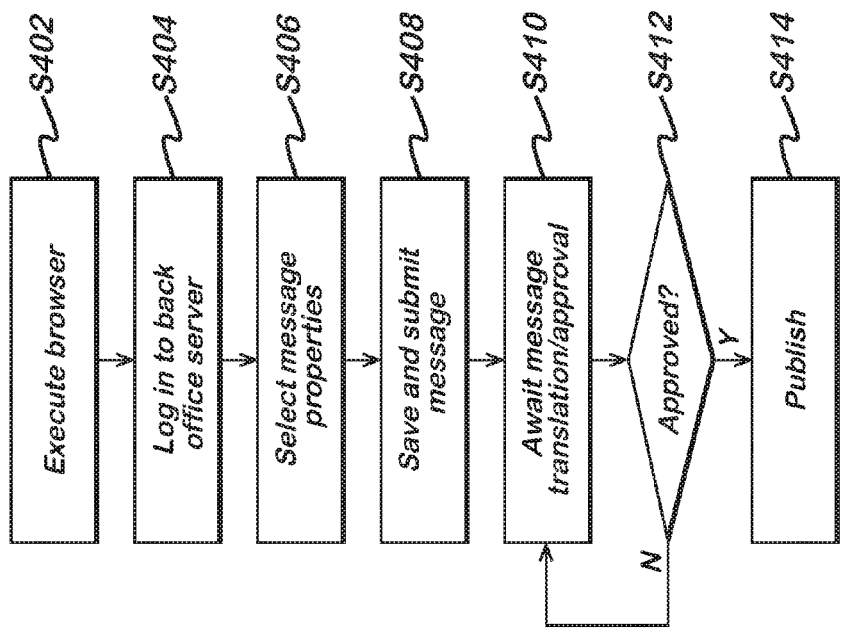
FIG. 4 shows a flowchart for defining and publishing a message.

FIG. 4 shows a flowchart for the process by which the message is created by the administrator 132. In step S402, the administrator executes the web browser program 140 on the user terminal 134. In step S404, the administrator 132 uses the web browser program 140 to log into a back office server (142 in FIG. 1) over the network 138. The back office server 142 displays to the administrator a selection of options that define the structure, content and properties of the message. In S406, the administrator selects the options required options to define what the message should display and when it should be displayed. The details of the message structure will be described with reference to FIG. 5 below.

Following the selection of the message options, in step S408, the administrator selects to save the message. The message is saved by the back office server 142 in a content database (144 in FIG. 1). The message is marked as requiring review. The review is an optional stage whereby the message is checked, e.g. for language. This may particularly be needed if translations of the messages into multiple languages are required. In step S410 and S412 the process waits for the message to be reviewed. Once the message has been approved, then in step S414 the message stored in the content DB 144 is marked as ready for publication to the clients.

The messages that are created are grouped together into "bundles". Bundles are created to minimise the amount of data that needs to be transmitted to the clients. Specifically, a bundle comprises the set of messages that are different to those messages that are pre-installed with the client. Therefore, the bundle constitutes changes or additions to the messages that the clients already contain. By creating the bundles, only those messages that are not already present in the client are transmitted. Obviously, if only a single message is updated compared to those already installed in the client, then the bundle will comprise only one message. As different versions of the clients will contain different messages when they are installed on the user terminals, different bundles need to be compiled for different client versions. Each bundle is given a unique identifier in order to distinguish between them. Once all the messages in a bundle have been approved, the bundle itself can be approved and can be marked as ready for publication to the clients The process by which the messages are delivered to the clients is described in detail with reference to FIG. 6 hereinafter.

Figure 5:
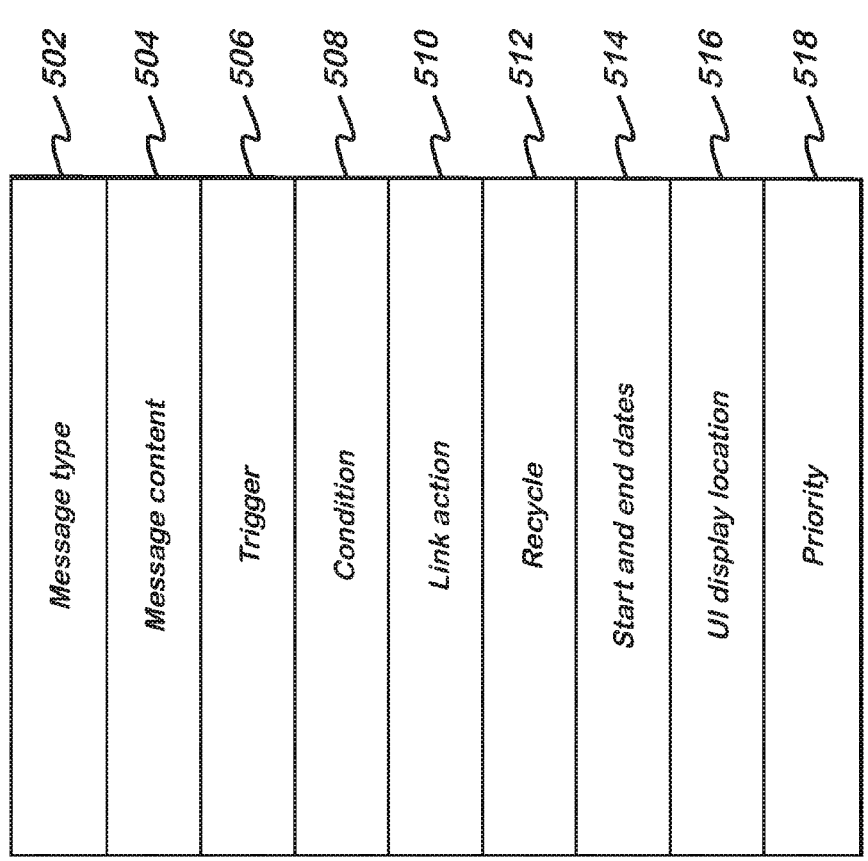
FIG. 5 shows the structure of a message.

Reference is now made to FIG. 5 which illustrates the detailed structure of the messages created by the above-described process and stored in the content DB 144. The message 500 comprises a message type field 502 which defines a particular category for the message. For example, the message type field 502 can define that the message is an information message, a user tip message or a promotion message. The type of message can be used to determine how the message is displayed in the client, for example background colours and icons can be displayed according to the type of message. The message 500 also comprises a message content field 504, which contains the actual information to be displayed to the users of the clients. The message content 504 can comprise text, images, animation (e.g. flash animation) or a combination of the above. Example message content will be described hereinafter.

The message 500 further comprises a trigger 506. The trigger 506 defines an event that must occur in the client before the message content is displayed to the user of the client. Example triggers include, but are not limited to:

Making a call from a P2P client to another P2P client;
Making a call from a P2P client to the PSTN;
Receiving a call at a P2P client from another P2P client;
Receiving a call at a P2P client from the PSTN;
Starting to send a video feed;
Starting to receive a video feed;
Making a conference call;
A date, time or period (e.g. a specific date or every x days);
A missed call;
A contact is added to the user's contact list;
Viewing a particular UI in the client;
Starting an IM chat conversation with one party; and
Started an IM chat conversation with more than one party (called a multichat).

In addition to the trigger event 506 that must occur for the message to be displayed, the message 500 can also define a condition 508 that must further be satisfied in order for the message to be shown to the user. Example conditions include, but are not limited to:

The time elapsed since the message was last displayed;
The value of the user's account balance for outgoing PSTN calls;
The date of expiry of credit in the user's account for outgoing PSTN calls;
Whether the user has subscribed to receive incoming PSTN calls;
The date of expiry of the user's incoming PSTN call subscription;
Whether the user has subscribed for voicemail;
The date of expiry of the user's voicemail subscription;
The user's region as defined in their profile;
A software registry key value;
The client version number for the user initiating a call;
The client version number for a user receiving a call;
The operating system on which the client is executed;
The user's privacy settings;
Has the user ever set a mood message;
The last date the user's avatar was changed;
Has the user ever had an IM chat conversation;
Has the user ever had an IM multi-chat conversation;
Has the user ever had a conference call;
Has the user ever used file transfer;
The number of contacts in the user's contact list;
Has the user set up call forwarding;
Has the user utilised a contact importing tool;
Has the user made a video call;
Has the user performed a video test;
Has the user made a PSTN call;
Is the other party in a call authorised by the user;
Is the other party in a call listed in the user's contact list;
The value of the audio gain level on the user's microphone;
The current call duration;
The currently viewed tab in the client UI;
The client's current CPU usage;
The current value of packet loss for a call;
The current roundtrip value for a call;
The currently available voice bandwidth;
The currently available video bandwidth;
Is the current call relayed over multiple peers;
The destination country of an outgoing PSTN call;
The originating country of an incoming PSTN call;
The amount of credit spent by the user today, this month, this year;
The language is the client in; and
The P2P identity (username) of the user.

Therefore, the trigger 506 defines the event that causes a particular condition 508 to be checked. The condition 508 in the message defines a value (e.g. a number, Boolean value or string) that must be checked against a certain property within the client before the display of the message can proceed. Furthermore, multiple conditions can be defined, such that more than one of the above-listed conditions must be met in order for the message to be displayed. Optionally, no condition can be set, such that only the trigger 506 is required in order for the message to be displayed.

The message 500 also comprises a link action field 510. The link action 510 defines the action that is taken by the client when the user clicks on a certain part of the message using the pointing device (e.g. a certain word, sequence of words or image). The link action 510 can define that the client executes a web browser program, which navigates to a certain webpage. Alternatively, the link action 510 can perform an action within the client itself (e.g. opening an option window, displaying the user's profile etc).

A recycle field 512 is present in the message 500, which defines a set number of times that the message content 504 should be displayed. Even if the message has triggered (506) and met the condition (508) it will only be displayed if the number of times it has been displayed previously does not exceed the recycle value 512. Therefore, the recycle value 512 ensures that a given message will only be shown a certain number of times, thereby preventing it from becoming annoying for the users. The recycle value 512 can also be set such that a message can be displayed an indefinite number of times.

The message 500 further comprises start and end date values 514. The start and end date values 514 define a time interval during which the message should be displayed. This allows messages to only be displayed over a certain period, which is useful, for example, for time-sensitive marketing campaigns. However, the values for the start and end dates can be set such that the messages are always able to be displayed regardless of the date.

The message 500 also comprises a display location 516 for the message in the user interface of the client. Example display locations are illustrated in more detail with reference to FIGS. 8 to 12. Furthermore, the message 500 comprises a priority field 518. The priority field 518 defines a priority level for the message in question, such that if the client attempts to display two or more messages in the same location at the same time, then only the message with the highest priority is displayed.

Therefore, at this point in the process a message has been created by the administrator 132 (as illustrated with reference to FIG. 4) comprising the properties described above with reference to FIG. 5, and is stored in the content DB 144. Note that the administrator can create a plurality of messages, each of which is stored in the content DB 144.

The process by which the messages are delivered to the clients is now described with reference to FIG. 1 and FIG. 6. The clients (110, 122) are configured to periodically check whether new messages are available to be downloaded. The message manager 324 (as illustrated in FIG. 3) is responsible for triggering the periodic check for new messages. The periodicity of the message checking can be defined in order to balance the requirements of rapidly delivering new messages against the consequential network and server load. For example, the message checking period can be every 14 days, although any time period may be used. In order to prevent all the clients in the P2P system simultaneously attempting to retrieve messages, each client independently maintains its own timer of when messages were last retrieved. Therefore, as the users install and execute clients at different times, this ensures that the message retrieval is distributed over time, thereby reducing peak network loading.

Referring to FIG. 6, in step S602 the client (110, 122) sends a "request content" message via the network interface (108, 123) over the P2P system. The "request content" message contains an identifier of the bundle of messages currently held by the client, which allows the message delivery system to determine which messages need to be provided to the client. The "request content" message also comprises the software version number for the client and the operating system used on the user terminal. This information is provided because different bundles of messages are compiled for different operating systems and client versions.

The "request content" message is transmitted from the client to a proxy server 146 over the P2P system. The function of the proxy server 146 is to provide an interface between the peers of the P2P system and backend systems. In particular, the proxy server 146 authenticates users of the P2P system to ensure that they are allowed to have access to the backend systems.

Providing the client can be authenticated, the proxy server 146 forwards the "request content" message to a message server 148 in step S604. The message server 146 acts as the interface to the content DB 144, and handles the delivery of messages to the clients. Multiple message servers can be utilised in practice, in order to handle the load from a large number of clients requesting content.

The message server 148 reads the information regarding the software version, operating system and current message bundle ID from the "request content" message, and determines whether newer messages need to be sent to the client. The message server 148 compares the bundle ID for the most recent bundle for the given operating system and software version to the bundle ID from the client. If a newer bundle of messages exists then the message server prepares to send this to the client. If the client already has the latest bundle (i.e. no existing messages have been changed or new ones added since either the client was installed or since the last time the client requested messages from the message server) then the process stops without messages being transmitted to the client.

Presuming that a newer bundle exists, the message server 148 requests the newer bundle from the content DB 144 in step S606, and in step S608 the newer message bundle is returned to the message server 148. Note that, in preferred embodiments, the message server 148 can also comprise a cache element 150, which is used to maintain a local cache of the most recent and commonly requested bundles. This can be advantageously utilised to avoid the need to fetch the bundle from the content DB 144, thereby reducing the load on the database.

In step S610, the message bundle is transmitted from the message server 148 to the proxy server 146. The proxy server 146 then transmits the message bundle to the client 110, 122 over the P2P system in step S612. The client then installs the message bundle. The new message bundle can add new messages to the client, as well as make changes to existing messages or delete messages. Once the message bundle is installed, the current bundle ID held at the client is updated. The message bundle is received by the message manager 324 in the client and stored in the message DB 326 in the client 110 as illustrated in FIG. 3.

In preferred embodiments, statistics about the messages displayed in the clients are also collected in step S614. For example, a set of statistics can be collected for each message, which include: a message identifier; the total number of times the message was displayed; the total number of times the user closed the message; the total number of times a link in the message is clicked on; and the total amount of time, in seconds, that the message was displayed. Different statistics requirements can be defined for different messages, and these statistics requirements can be pre-set in the installed client, or can be communicated to the client along with the bundle of messages.

The statistics collected by the client are reported back to the message server 148 periodically by the client. For example, the client can be arranged to report statistics every four hours. When a time period has passed such that the client needs to report statistics, then the statistics are collated and transmitted in S616 to the proxy server 146, and forwarded to the message server 148 in S618. The message server 148 then stores the statistics in the statistics DB 152 in step S620. The steps of S616 to S620 are repeated whenever the period for reporting statistics expires.

Figure 7:
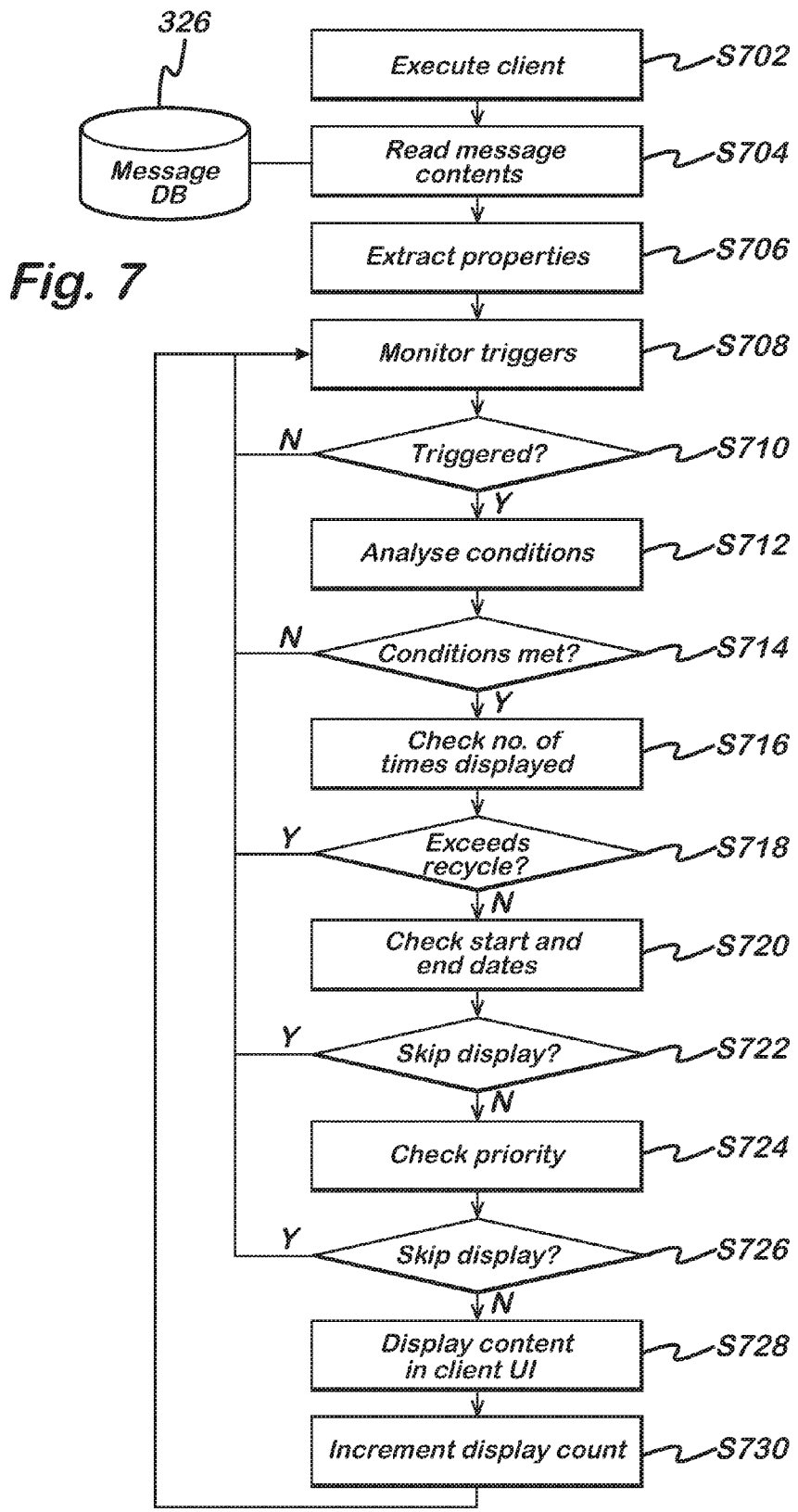
FIG. 7 shows a flowchart for a client to display a message.

Reference is now made to FIG. 7, which illustrates the process by which messages received at the client are interpreted and displayed. In step S702, the client 110 is executed on the user terminal 104 of the user 102. In step S704, the message manager 324 of the client 110 reads the messages stored in the message DB 326. In step S706, the message manager 324 extracts the message properties from the messages, specifically those properties described above with reference to FIG. 5, including the trigger, conditions, recycle value, start and end dates and priority. The message manager 324 can then begin monitoring the client 110 behaviour to determine whether to display the message.

In step S708, the message manager 324 starts monitoring the triggers defined in the message. Example triggers were outlined hereinabove. If, in step S710, the event defined by the trigger has not yet occurred, then the message manager 324 continues monitoring in S708. Alternatively, if the trigger event has occurred, then in step S712 the conditions defined by the message are analysed. Example conditions were described hereinbefore. Typically, the conditions define a value that needs to be compared against a property within the client. The message manager 324 performs this comparison to determine if the condition is met. Note that multiple conditions may be defined in the message, which must all be met, or a null condition defined which is always met by default.

If the conditions are not met, then in step S714 the message manager 324 ceases to process the current message in question, and returns to monitoring triggers in step S708 for the display of future messages. Alternatively, if the conditions are met, then in step S716 the message manager 324 checks the number of times that the message in question has been displayed. If it is found in step S718 that this exceeds the recycle value for this message, then the message is not displayed, and the message manager returns to monitoring triggers in step S708. If, however, step S718 finds that the recycle value has not been exceeded, then the process proceeds to step S720.

In step S720, the message manager 324 checks the start and end date values for this message. As mentioned before, these values define a time interval during which the message should be displayed. Therefore, in step S720, the message manager compares the current date to the start and end dates, to determine if the current date falls within them. If in step S722 the current date is not within the start and end dates, then the message display should be skipped and the message manager 324 returns to monitoring the triggers in step S708.

If the message is to be displayed (i.e. the current date is within the start and end dates), then in step S724 it is checked whether another message is already displayed at this display location, and if so, the priority levels of the message are compared. In step S726, if the priority level of the current message is lower than another message already being displayed, then the current message is not displayed and step S708 is returned to. However, if another message is not being displayed at the display location, or the current message has a higher priority, then in step S726 the message display is not skipped, and in the step S728 the message is displayed in the UI of the client 110. More details on the display of the message in the client is provided with reference to FIGS. 8 to 13 below. Finally, in step S730, the count of the number of times the message in question has been displayed is incremented, before the message manager 324 returns to monitoring the triggers in step S708.

The above process is obviously performed for every message that is stored in the bundles in the message DB 326. It should also be noted that the monitoring, triggering and display of messages happens in parallel for all messages in the client. Therefore, more than one message can be triggered and displayed in the client at one time.

Reference is now made to FIGS. 8 to 12, which illustrates example locations where the messages can be displayed in the client 110. As mentioned with regards to FIG. 5, the messages define a UI display location (516) which determines where the message is displayed.

Figure 8:
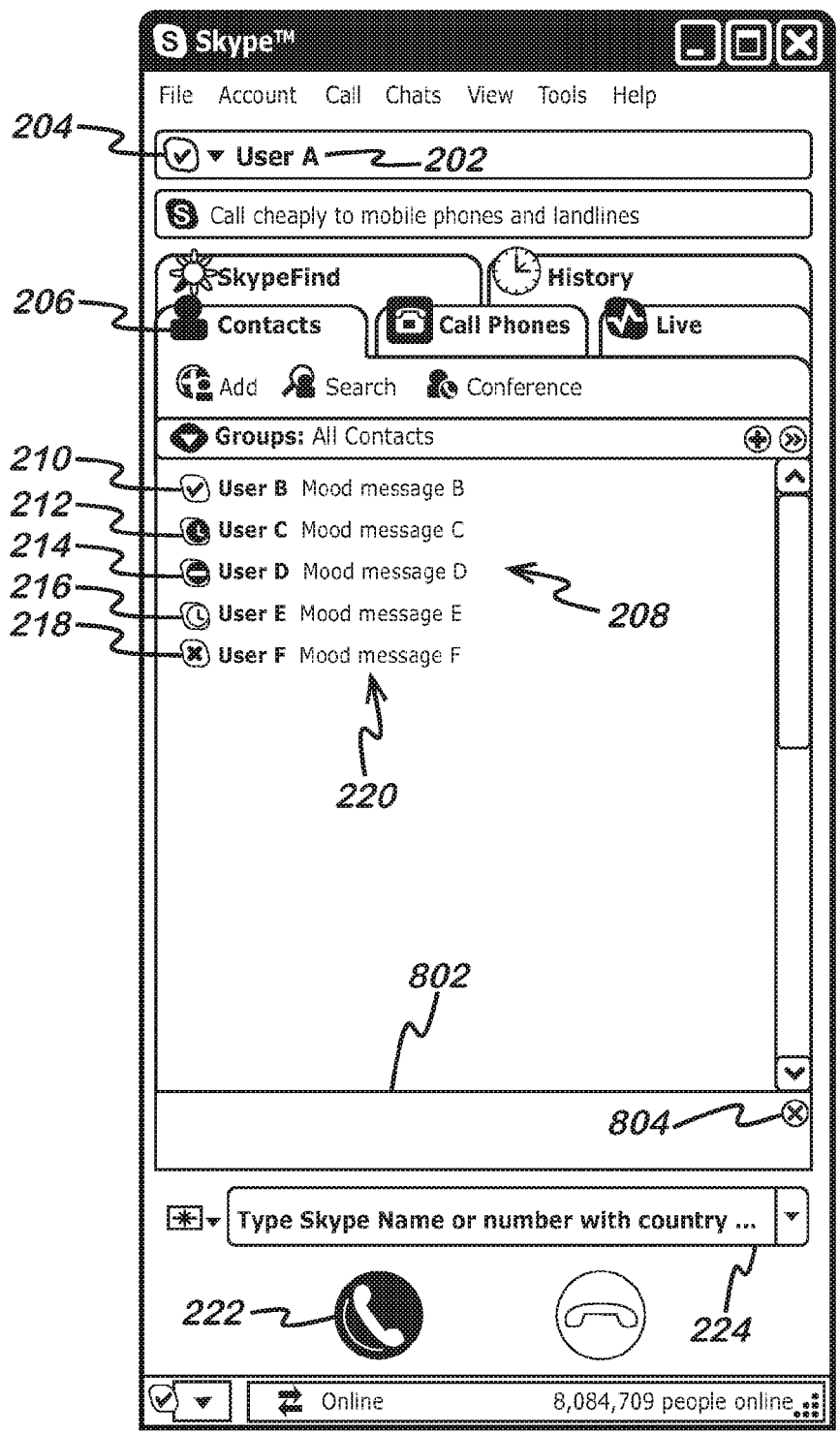
FIG. 8 shows a message display region in a contact tab of a client.

FIG. 8 shows the user interface of the client 110 when displaying the contact list tab 206, as described above with reference to FIG. 2. However, in the case of FIG. 8, there is a placeholder 802 for a message to be displayed below the contact list. The message placeholder 802 comprises a close button 804 that removes the message from the display, thereby reverting the client to the form shown in FIG. 2.

Figure 9:
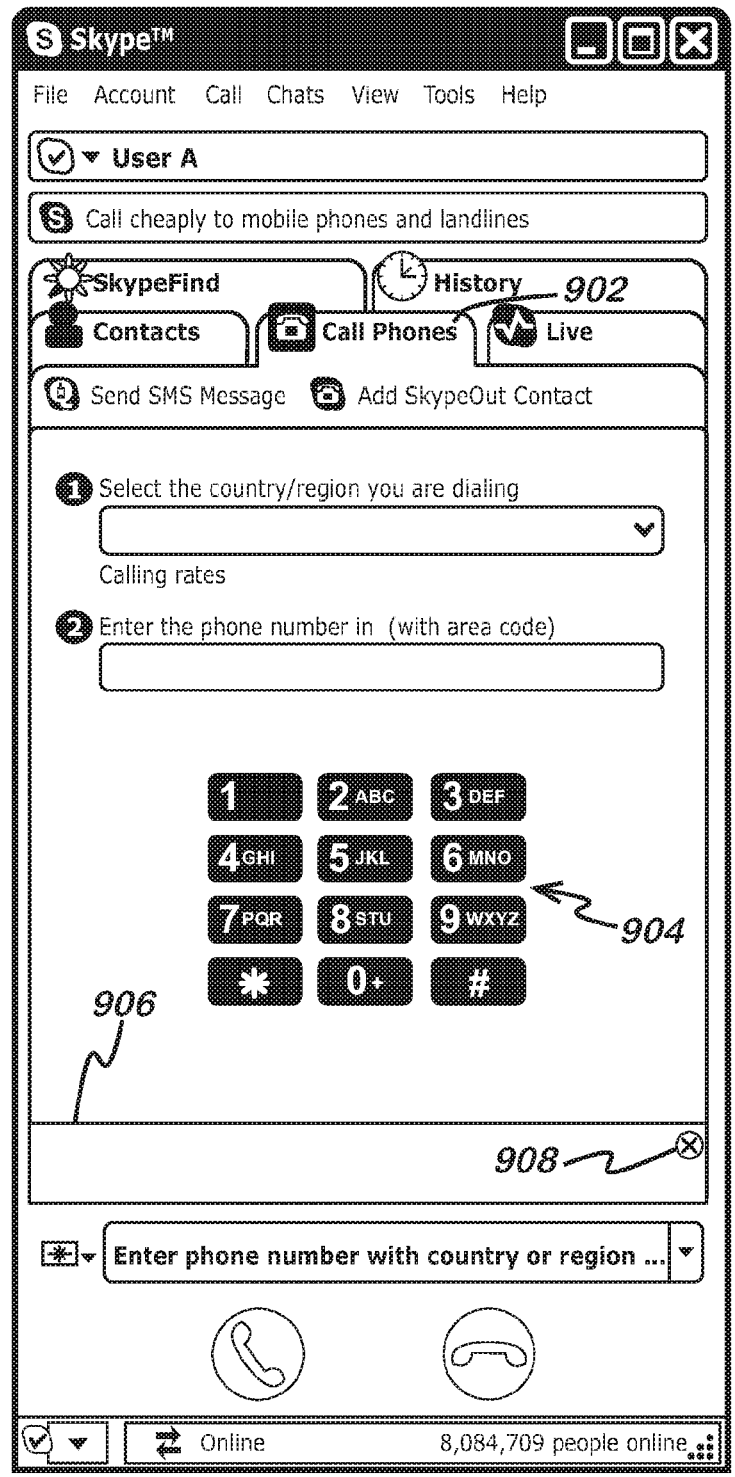
FIG. 9 shows a message display region in a dial tab of a client.
Figure 10:
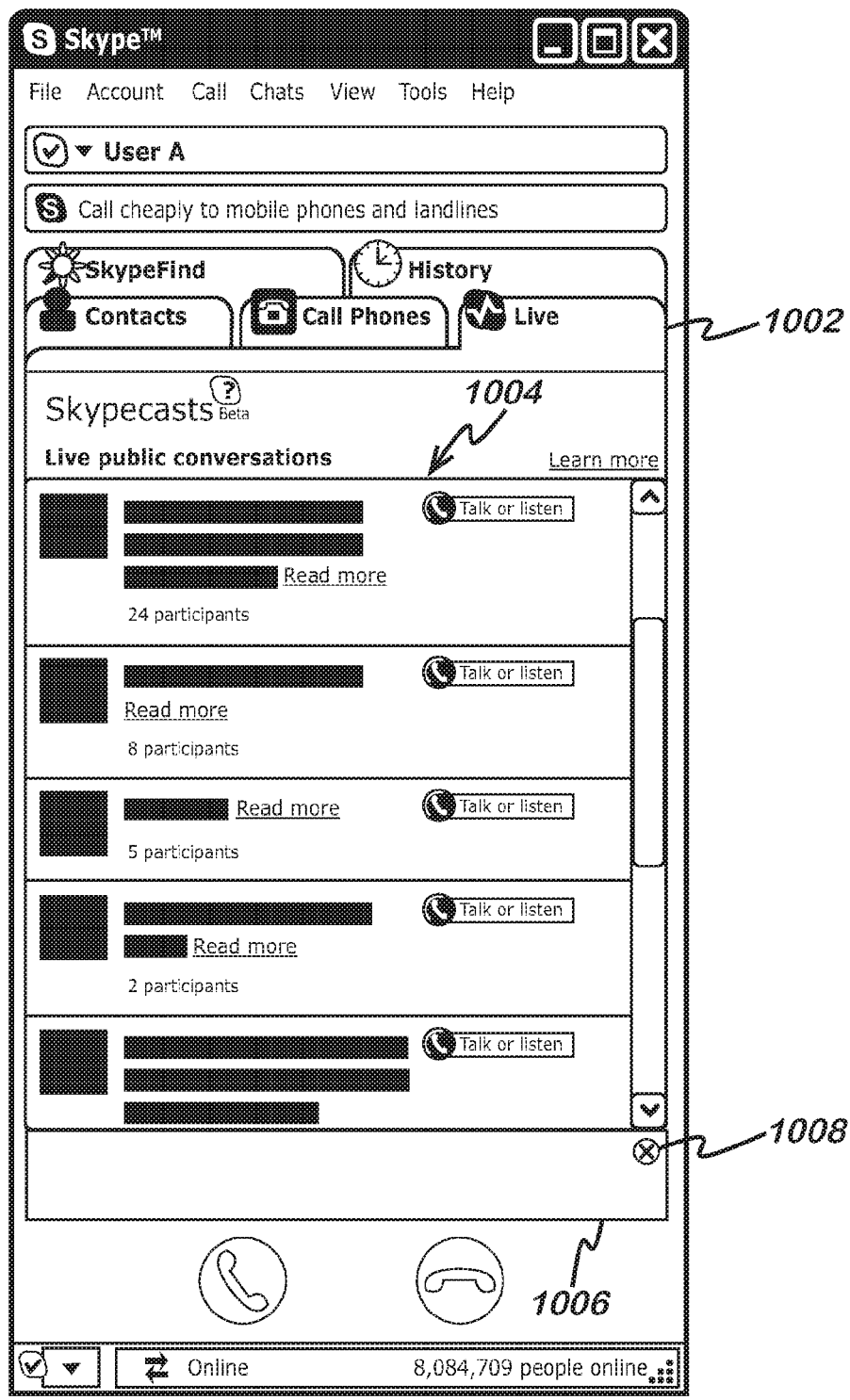
FIG. 10 shows a message display region in a public conversations tab of a client.

FIG. 9 shows the UI of the client 110 when the tab named "call phones" 902 is selected. This tab 902 displays a keypad 904, allowing the user to enter a telephone number to call. This tab 902 shows an example message display location 906 with a close button 908 as described above. FIG. 10 shows the UI of the client when the tab labelled "live" 1002 is selected. This tab 1002 displays a list 1004 of ongoing and upcoming public conversations that can be joined by the user. This tab 1002 also displays an example message location 1006 with a close button 1008.

Figure 11:
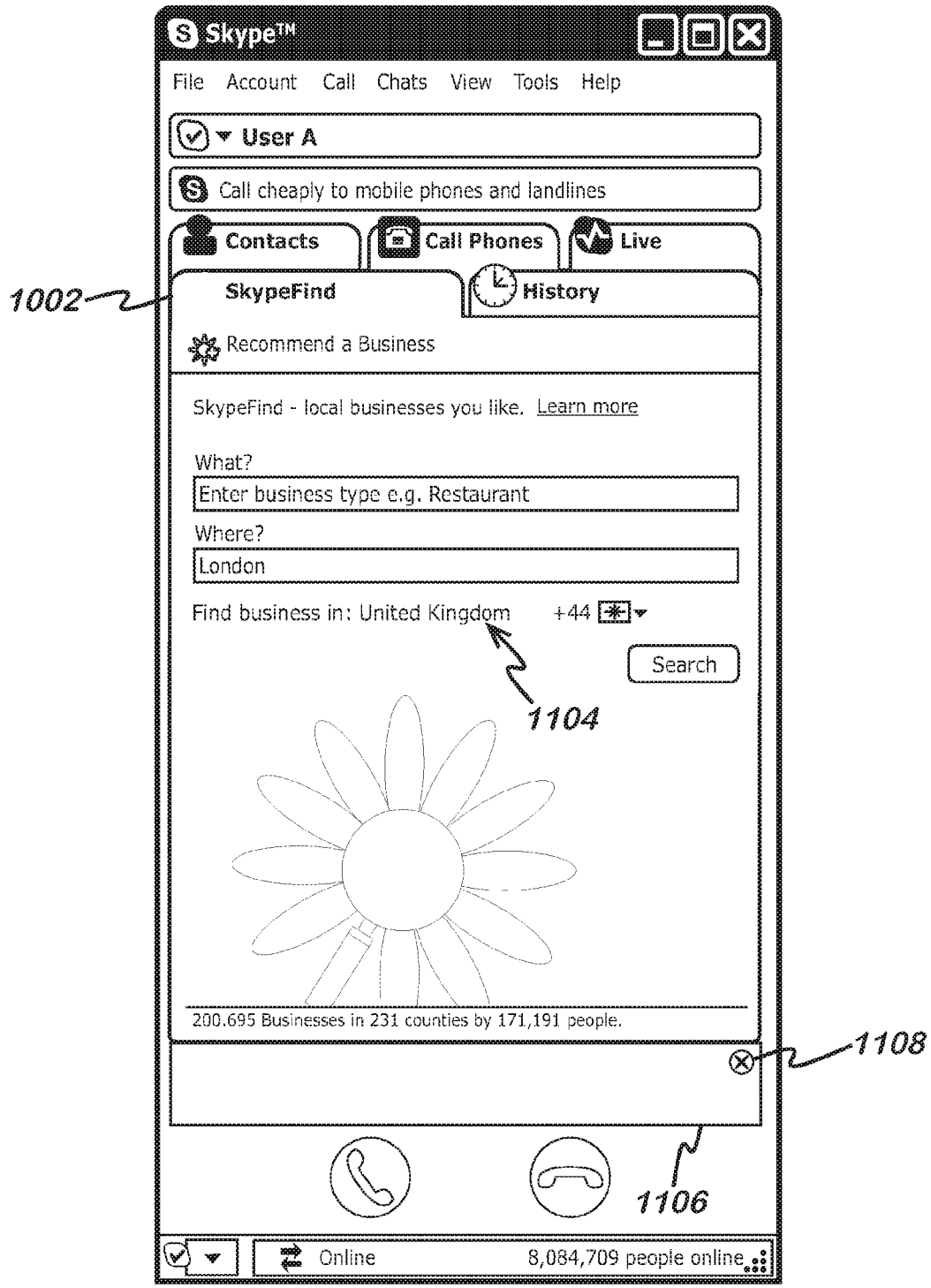
FIG. 11 shows a message display region in a directory tab of a client.
Figure 12:
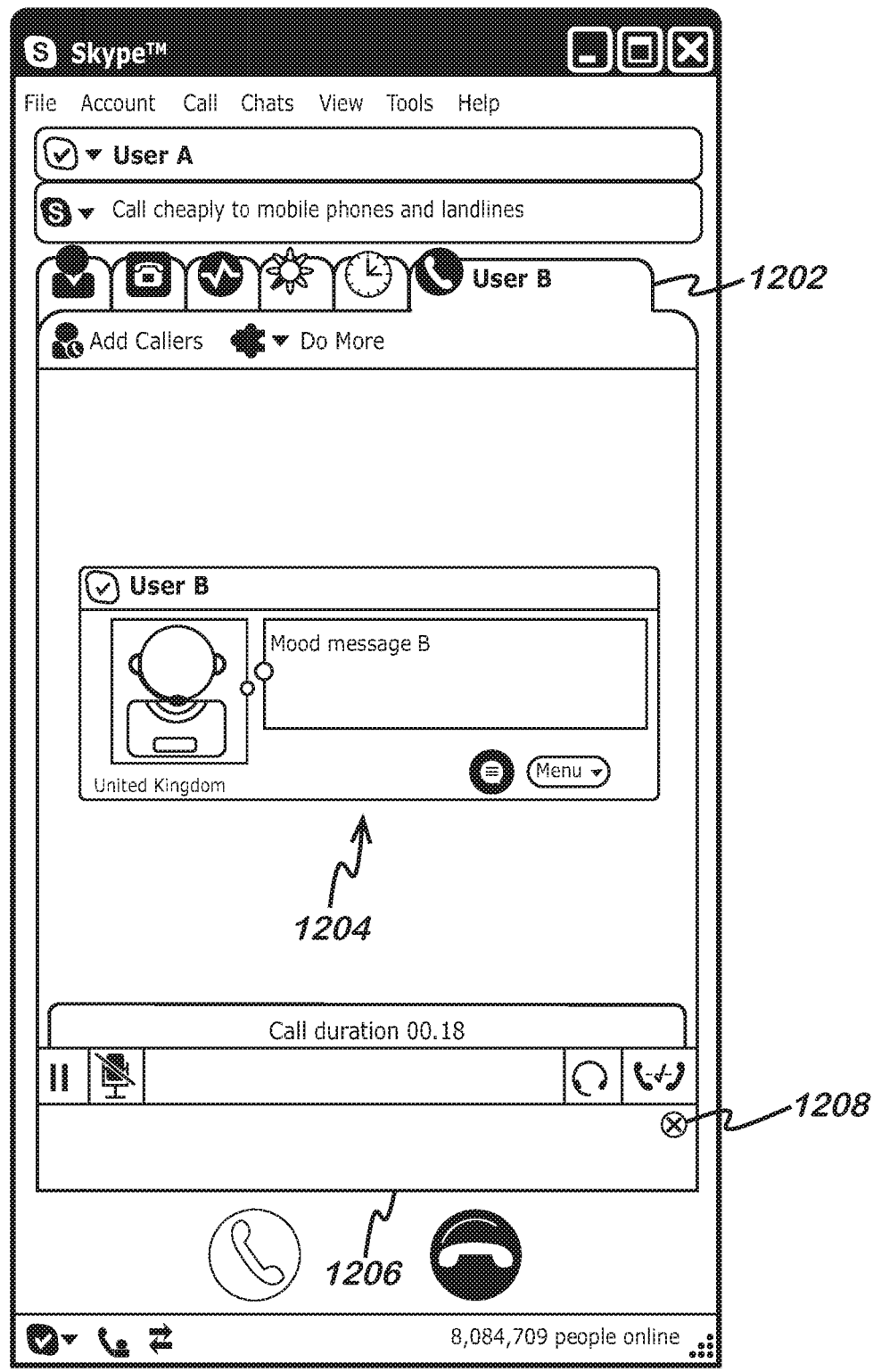
FIG. 12 shows a message display region displayed during a call.

FIG. 11 illustrates the UI of the client 110 when the tab labelled "SkypeFind" 1102 is selected by the user. This tab 1102 displays a directory service with fields 1104 for searching for businesses. This tab 1102 displays an example message location 1106 with a close button 1108. FIG. 12 shows the tab displayed to the user of the client 110 when a call is in progress. In this case, User A 102 is in a call with User B114. The call tab 1202 displays information 1204 about the user being called. An example message location 1206 with a close button 1208 is shown at the bottom of the tab.

Reference is now made to FIG. 13, which illustrates a set of example messages that can be displayed in the UI locations described previously.

Message 1302 is a message displayed in the call tab 1202 as shown in FIG. 12. This message indicates to the user that the client 110 cannot detect any sound on the microphone, and hence there may be a problem with the audio settings. The trigger for this message is making a call (of any type), and the condition is the audio gain level on the microphone. The link in the message (i.e. the link action 510 from FIG. 5) takes the user to the audio settings of the client 110 (i.e. a location internal to the client).

Message 1304 is a message displayed in the contacts tab 206 shown in FIG. 8. The message prompts the user to sign up for a voicemail service. The trigger for this message is a missed call at the client, and the condition is that user has not subscribed to voicemail. The link takes the user to an internet page where they can subscribe to the voicemail service.

Message 1306 is a message displayed in the call phones tab 902 shown in FIG. 9. This message informs the user that they need to purchase credit in order to make calls to the PSTN network. The trigger is the user viewing the call phones tab 902, and the condition is the user's credit balance is zero. The link action takes the user to an internet page where they can purchase credit.

Message 1308 is a promotional message displayed in the contacts list tab 206 shown in FIG. 8. This message promotes a service whereby the user can purchase a telephone number to allow PSTN users to call their VoIP client. The trigger for this message is time-based, such that it is displayed on a specified number of days. The condition is that the user has not already signed up for this service—i.e. it is not desirable to promote a service the user already has. The link takes the user to an internet page where they can subscribe to the service.

Message 1310 is a message displayed in the call tab 1202 shown in FIG. 12. If the user was making a PSTN call (trigger) and the balance of his account goes to zero (condition) then the message is displayed. The links display webpages for the user to buy more credit and to set up an automatic credit recharging system.

Message 1312 is a promotional message displayed in the live 1002 or SkypeFind 1102 tabs in FIG. 10 or 11 respectively. This message includes images as well as text. The message promotes a subscription service. The trigger is time-based, and the condition is that the user has not already subscribed to the service. The link displays a webpage in which the user can subscribe to the service.

Message 1314 is displayed in the call tab 1202. The trigger is that the user is making a call to a PSTN number. There is no condition applied to this message. The message notifies the user that the call would be free if the other party also used the VoIP service, and the link takes the user to a webpage where the user can invite the other party to join the VoIP service.

Therefore, as shown with the examples above, the messages displayed in the client are relevant to the particular user of the client, due to using triggers and conditions that are dependent upon actions occurring within the client itself.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
receiving, at a user terminal, a message comprising a content portion and a control portion, the control portion comprising data defining a condition and a trigger event that causes the condition to be checked, the content portion comprising information configured to be displayed at the user terminal when the trigger event occurs if the condition is satisfied, the control portion identifying the trigger event as an event that is to occur at the user terminal before the condition is to be checked;
extracting the data defining the trigger event and the condition from the control portion of the message;
subsequent to receiving the message, monitoring the user terminal to detect occurrence of the trigger event;
responsive to detecting the occurrence of the trigger event, determining whether the condition is satisfied;
responsive to determining that the condition is satisfied, displaying the information in a user interface at the user terminal, the user interface including a selectable option that is selectable to reconfigure an attribute of a communication client on the user terminal; and
responsive to receiving an indication of a selection of the selectable option, causing the attribute of the communication client to be reconfigured.

2. A method according to claim 1, wherein the condition comprises one or more parameters and one or more respective required values, and wherein the determining whether the condition is satisfied comprises reading, for each of the one or more parameters, a current value of the parameter in the user terminal and comparing the current value to the respective required value.

3. A method according to claim 2, wherein at least one of the one or more parameters is a display count for the message and the respective required value defines a maximum number of times the message should be displayed.

4. A method according to claim 2, wherein at least one of the one or more parameters is a time interval parameter and the respective required value defines a start time and an end time for displaying the message.

5. A method according to claim 1, further comprising transmitting, prior to the receiving, a request for messages over a communication network.

6. A method according to claim 5, wherein the request for messages comprises an identifier of messages stored at the user terminal.

7. A method according to claim 5, wherein the request for messages comprises at least one of a version number for a communication client executed on the user terminal and an identifier of an operating system executed on the user terminal.

8. A method according to claim 1, wherein the message is received at the user terminal in a bundle comprising a plurality of messages.

9. A method according to claim 1, wherein the displayed information comprises a selectable control configured to cause display of further information.

10. A method according to claim 9, wherein the further information is obtained from a communication network.

11. A method according to claim 9, wherein the selectable control is a hyperlink comprising a network address of the further information.

12. A method according to claim 1, wherein the receiving, extracting, monitoring, determining, and displaying are performed by a voice over internet protocol communication client executing on the user terminal.

13. A method according to claim 12, wherein the voice over internet protocol communication client is a peer-to-peer communication client.

14. A computer-readable storage memory comprising computer-readable program code stored thereon that, responsive to execution by one or more processors, implements a communication client, the communication client configured to perform a method comprising:
receiving a message comprising a content portion and a control portion, the control portion comprising data defining a condition and a trigger event that causes the condition to be checked, the content portion comprising information configured to be displayed at a user terminal when the trigger event occurs if the condition is satisfied, the control portion identifying the trigger event as an event that is to occur at the user terminal before the condition is to be checked;

extracting the data defining the trigger event and the condition from the control portion of message;

subsequent to receiving the message, monitoring the communication client to detect occurrence of the trigger event;

responsive to detecting the occurrence of the trigger event, determining whether the condition is satisfied;

responsive to determining that the condition is satisfied, displaying the information in a user interface of the communication client, the user interface including a selectable option that is selectable to reconfigure an attribute of the communication client; and responsive to receiving an indication of a selection of the selectable option, causing the attribute of the communication client to be reconfigured.

15. A user terminal according to claim 14, wherein the communication client is further configured to transmit a request for messages over a packet-based communication network, and the request for messages comprises an identifier of messages stored at the user terminal.

16. A user terminal according to claim 14, wherein the communication client is further configured to transmit a request for messages over a packet-based communication network, and the request for messages comprises at least one of a version number for the communication client and an identifier of an operating system executed on the user terminal.

17. A user terminal connected to a packet-based communication network, the user terminal comprising:
a data store;
a display; and
a processor configured to execute a software program comprising a communication client, the communication client configured to cause display of a user interface on the display to enable user interaction with the communication client, the communication client further configured to:

receive a message comprising a content portion and a control portion, the control portion comprising data defining a condition and a trigger event that causes the condition to be checked, the content portion comprising information configured to be displayed at the user terminal when the trigger event occurs if the condition is satisfied, the control portion identifying the trigger event as an event that is to occur at the user terminal before the condition is to be checked;

extract the data defining the trigger event and the condition from the control portion of the message;

subsequent to receiving the message, monitor the communication client to detect occurrence of the trigger event;

responsive to detecting the occurrence of the trigger event, determine whether the condition is satisfied;

responsive to determining that the condition is satisfied, display the information in the user interface, the user interface including a selectable option that is selectable to reconfigure an attribute of a communication client on the user terminal; and responsive to receiving an indication of a selection of the selectable option, causing the attribute of the communication client to be reconfigured.

18. A user terminal according to claim 17, wherein the communication client is further configured to transmit a request for messages over the packet-based communication network.

19. A user terminal according to claim 18, wherein the request for messages comprises an identifier of messages stored at the user terminal.

20. A user terminal according to claim 18 wherein the request for messages comprises at least one of a version number for the communication client and an identifier of an operating system executed on the user terminal.

* * * * *